US010049658B2

(12) United States Patent
Pinto et al.

(10) Patent No.: US 10,049,658 B2
(45) Date of Patent: Aug. 14, 2018

(54) METHOD FOR TRAINING AN AUTOMATIC SPEECH RECOGNITION SYSTEM

(71) Applicant: Nuance Communications, Inc., Burlington, MA (US)

(72) Inventors: Joel Pinto, Aachen (DE); Josef Damianus Anastasiadis, Aachen (DE); Daniel Willett, Walluf (DE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/773,142

(22) PCT Filed: Mar. 7, 2013

(86) PCT No.: PCT/US2013/029497
§ 371 (c)(1),
(2) Date: Sep. 4, 2015

(87) PCT Pub. No.: WO2014/137341
PCT Pub. Date: Sep. 12, 2014

(65) Prior Publication Data
US 2016/0027435 A1 Jan. 28, 2016

(51) Int. Cl.
*G10L 15/07* (2013.01)
*G10L 15/26* (2006.01)
(Continued)

(52) U.S. Cl.
CPC ............ *G10L 15/07* (2013.01); *G10L 15/063* (2013.01); *G10L 15/20* (2013.01); *G10L 15/26* (2013.01);
(Continued)

(58) Field of Classification Search
CPC ......... G10L 15/07; G10L 15/20; G10L 15/26; G10L 15/063; G10L 2015/0635; G10L 2015/0638
(Continued)

(56) References Cited

U.S. PATENT DOCUMENTS 6,434,110 B1 * 8/2002 Hemkumar ........... H04M 9/082
370/201
6,707,910 B1 * 3/2004 Valve ...................... G10L 25/78
342/423

(Continued)

OTHER PUBLICATIONS

EMCA International. "Designing an Object Model for ECMA-269 (CSTA)." Published as Technical Report ECMS TR/88, 1st edition, Jun. 2004 [online] {retrieved on Apr. 12, 2013 (Apr. 12, 2013)} Retrieved from the internet /222.ecma-internationa.org/flat/publications/files/ESMA-TRFrR-088.pdf>.*

(Continued)

*Primary Examiner* — Edwin S Leland, III
(74) *Attorney, Agent, or Firm* — Brian J. Colandreo; Michael T. Abramson; Holland & Knight LLP

(57) ABSTRACT

A system and method for speech recognition is provided. Embodiments may include receiving, at a first computing device, a far-talk signal from a far-talk computing device, the far-talk signal transmitted using a first channel and corresponding to an audible sound. Embodiments may further include receiving, at the first computing device, a near-talk signal from a near-talk computing device, the near-talk signal transmitted using a second channel and corresponding to the audible sound, wherein the far-talk signal and the near-talk signal are received during an enrollment phase of a far-talk speech recognition system. Embodiments may also include updating, at the first computing device, one or more models associated with a far-talk speech recognition system based upon, at least in part, one or more (Continued)

characteristics of the far-talk signal and one or more characteristics of the near-talk signal.

21 Claims, 6 Drawing Sheets

(51) Int. Cl.
*G10L 15/06* (2013.01)
*G10L 15/20* (2006.01)
(52) U.S. Cl.
CPC ............... *G10L 2015/0635* (2013.01); *G10L 2015/0638* (2013.01)
(58) Field of Classification Search
USPC .......................................... 704/244
See application file for complete search history.

(56) References Cited

U.S. PATENT DOCUMENTS

| | | | | |
|---|---|---|---|---|
| 7,440,891 B1* | 10/2008 | Shozakai | ............... | G10L 15/20 704/233 |
| 8,855,295 B1* | 10/2014 | Chhetri | ............... | H04M 9/082 379/406.03 |
| 2003/0235244 A1* | 12/2003 | Pessoa | ............... | H03H 21/0012 375/232 |
| 2007/0033005 A1* | 2/2007 | Cristo | ............... | G06F 17/279 704/9 |
| 2009/0018826 A1* | 1/2009 | Berlin | ............... | G10L 15/07 704/223 |
| 2009/0055170 A1* | 2/2009 | Nagahama | ............... | G10L 15/20 704/226 |
| 2010/0124339 A1* | 5/2010 | Turnbull | ............... | H04R 3/005 381/86 |
| 2011/0033059 A1* | 2/2011 | Bhaskar | ............... | H04M 9/082 381/71.4 |
| 2011/0112666 A1* | 5/2011 | McFarland | ............. | G06F 3/162 700/94 |
| 2011/0194685 A1* | 8/2011 | van de Laar | ......... | H04M 9/082 379/406.01 |
| 2012/0150536 A1* | 6/2012 | Dognin | ............... | G10L 15/144 704/231 |
| 2012/0243698 A1* | 9/2012 | Elko | ............... | H04M 9/082 381/66 |
| 2013/0024196 A1* | 1/2013 | Ganong | ............... | G10L 17/00 704/246 |
| 2013/0156198 A1* | 6/2013 | Kim | ............... | H04R 1/323 381/17 |
| 2013/0257753 A1* | 10/2013 | Sharma | ............... | G06F 3/0488 345/173 |
| 2014/0056435 A1* | 2/2014 | Kjems | ............... | G10L 15/20 381/66 |
| 2014/0257811 A1* | 9/2014 | Lavallee | ........... | G06F 17/30976 704/244 |
| 2014/0278397 A1* | 9/2014 | Chen | ............... | G10L 21/02 704/233 |
| 2014/0278423 A1* | 9/2014 | Dellisanti | ............... | G10L 25/60 704/254 |
| 2015/0180536 A1* | 6/2015 | Zhang | ............... | H04B 3/23 381/66 |
| 2016/0019884 A1* | 1/2016 | Xiao | ............... | G10L 15/063 704/232 |
| 2016/0027435 A1* | 1/2016 | Pinto | ............... | G10L 15/20 704/244 |
| 2016/0044159 A1* | 2/2016 | Wolff | ............... | H04M 9/082 379/406.08 |
| 2016/0055862 A1* | 2/2016 | Wolff | ............... | H04M 9/082 381/66 |
| 2016/0127527 A1* | 5/2016 | Mani | ............... | G10L 21/0216 379/388.07 |
| 2016/0170970 A1* | 6/2016 | Lindblom | ............... | G06F 17/28 704/3 |
| 2016/0358602 A1* | 12/2016 | Krishnaswamy | ....... | G10L 15/20 |
| 2016/0358606 A1* | 12/2016 | Ramprashad | ........... | G10L 15/20 |

OTHER PUBLICATIONS

EMCA International. "Designing an Object Model for ECMA-269 (CSTA)." Published as Technical Report ECMS TR/88, 1st edition, Jun. 2004 [online] {retrieved on Apr. 12, 2013 (Apr. 12, 2013)} Retrieved from the internet /222.ecma-internationa.org/flat/publications/files/ECMA-TRFrR-088.pdf>.*
Notification Concerning Transmittal of International Preliminary Report on Patentability issued in related International Application No. PCT/US2013/029497, dated Sep. 17, 2015 (7 pages).
International Search Report and Written Opinion issued in related International Application No. PCT/US2013/029497 dated May 20, 2013.
EMCA International. "Designing an Object Model for ECMA-269 (CSTA)." Published as Technical Report ECMS TR/88, 1st edition, Jun. 2004 [online] {retrieved on Apr. 12, 2013 (Apr. 12, 2013)} Retrieved from the internet <URL: <http://222.ecma-internationa. org/flat/publications/files/ECMA-TR/TR-088.pdf>, entire document, especially sections 6.2, 7.6, 7.7 and 7.8.
Erdogan et al, "Multi-modal Person Recognition for Vehicular Applications." in: Multiple Classifier Systems (MCS 2005), Lecture Notes in Computer Science (LNCS), vol. 3641, pp. 366-375, Dec. 2005 [online] [retrieived on Apr. 12, 2013 (Apr. 12, 2013)] Retrieved from the Internet <URL: http://193.256. 135.33/-haerdogan/pubs/erdogan05mpr.pdf>, entire document, especially abstract Fig. 1,2; sections 2,3.

* cited by examiner

METHOD FOR TRAINING AN AUTOMATIC SPEECH RECOGNITION SYSTEM

RELATED APPLICATIONS

The subject application is a U.S. National Stage Application of International Application No. PCT/US2013/029497, filed on Mar. 7, 2013, the contents of which are herein incorporated by reference in its entirety.

TECHNICAL FIELD

This disclosure relates to automatic speech recognition systems (ASR) and, more particularly, to a method for training an automatic speech recognition system having a far-talk and a near-talk computing device.

BACKGROUND

Automatic speech recognition may refer to the transcription, by a computing device, of spoken language into readable text. Some speech recognition (SR) systems use user or speaker specific training, where a speaker may read sections of text into the SR system. These systems are often configured to analyze the person's specific voice and use it to fine tune the recognition of that person's speech, resulting in more accurate transcription. Systems that do not use specific training are often referred to as "Speaker Independent" systems. Systems that use such training are called "Speaker Dependent" systems. ASR systems usually fail when they encounter speech from far-talk microphones. As a result, far-talk speech acquisition can cause significant degradation in the performance of ASR systems.

SUMMARY OF DISCLOSURE

In one implementation, a method, in accordance with this disclosure, may include receiving, at a first computing device, a far-talk signal from a far-talk computing device, the far-talk signal transmitted using a first channel and corresponding to an audible sound. The method may further include receiving, at the first computing device, a near-talk signal from a near-talk computing device, the near-talk signal transmitted using a second channel and corresponding to the audible sound, wherein the far-talk signal and the near-talk signal are received during an enrollment phase of a far-talk speech recognition system. The method may also include updating, at the first computing device, one or more models associated with a far-talk speech recognition system based upon, at least in part, one or more characteristics of the far-talk signal and one or more characteristics of the near-talk signal.

One or more of the following features may be included. In some embodiments, updating may include estimating one or more references for applying unsupervised adaptation techniques associated with the far-talk speech recognition system. In some embodiments, updating may include determining a non linear mapping between the far-talk signal and the near-talk signal. In some embodiments, updating may include determining at least one room impulse response characteristic. In some embodiments, updating may include optimizing at least one beam-forming setting. In some embodiments, the near-talk device may be at least one of a mobile phone and a remote control device. In some embodiments, the far-talk device may be at least one of a television and an in-car device. In some embodiments, receiving a far-talk signal may include receiving an identification code associated with the far-talk computing device. In some embodiments, receiving a near-talk signal may include receiving an identification code associated with the near-talk computing device. The method may further include transmitting, using the first computing device, the one or more models to the far-talk computing device.

In another implementation, a system is provided. The system may include a first computing device configured to receive a far-talk signal from a far-talk computing device, the far-talk signal transmitted using a first channel and corresponding to an audible sound. The first computing device may be further configured to receive a near-talk signal from a near-talk computing device, the near-talk signal transmitted using a second channel and corresponding to the audible sound, wherein the far-talk signal and the near-talk signal are received during an enrollment phase of a far-talk speech recognition system. The first computing device may be further configured to update one or more models associated with a far-talk speech recognition system based upon, at least in part, one or more characteristics of the far-talk signal and one or more characteristics of the near-talk signal.

One or more of the following features may be included. In some embodiments, updating may include estimating one or more references for applying unsupervised adaptation techniques associated with the far-talk speech recognition system. In some embodiments, updating may include determining a non linear mapping between the far-talk signal and the near-talk signal. In some embodiments, updating may include determining at least one room impulse response characteristic. In some embodiments, updating may include optimizing at least one beam-forming setting. In some embodiments, the near-talk device may be at least one of a mobile phone and a remote control device. In some embodiments, the far-talk device may be at least one of a television and an in-car device. In some embodiments, receiving a far-talk signal may include receiving an identification code associated with the far-talk computing device. In some embodiments, receiving a near-talk signal may include receiving an identification code associated with the near-talk computing device.

In another implementation, a computer-implemented method is provided. The method may include transmitting a far-talk signal from a far-talk computing device to a server computing device, the far-talk signal transmitted using a first channel and corresponding to an audible sound. The method may further include transmitting a near-talk signal from a near-talk computing device to a server computing device, the near-talk signal transmitted using a second channel and corresponding to the audible sound, wherein the far-talk signal and the near-talk signal are received during an enrollment phase of a far-talk speech recognition system, wherein the server computing device is configured to update one or more models associated with a far-talk speech recognition system based upon, at least in part, one or more characteristics of the far-talk signal and one or more characteristics of the near-talk signal.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION OF THE EMBODIMENTS

Embodiments provided herein are directed towards addressing issues with automatic speech recognition systems having far-talk and near-talk computing devices associated therewith. As discussed above, far-talk speech acquisition may cause significant degradation in the performance of ASR systems. Embodiments disclosed herein may be configured to enable the user of a live deployed far-talk ASR system (e.g. a television in a living room, etc.) or a standalone product (e.g. a speech recognition application associated with a personal computer, etc.) to simultaneously acquire and exploit near-talk speech during an enrollment phase such that the performance of the far-talk ASR can be improved using offline methods.

As used herein, the term "near-talk device" may refer to a device that is physically closer to an audio source than a "far-talk device". The near-talk and far-talk devices described herein may be any suitable electronic device such as the computing devices discussed above. Additionally and/or alternatively, one or more of the near-talk device and the far-talk device may correspond to devices other than traditional computing devices, for example, remote control devices incorporating one or more microphones, or any device incorporating audio recording functionality, etc. As used herein, the phrase "audio source" may refer to any source of sound, for example, a user's mouth, etc.

Figure 1:
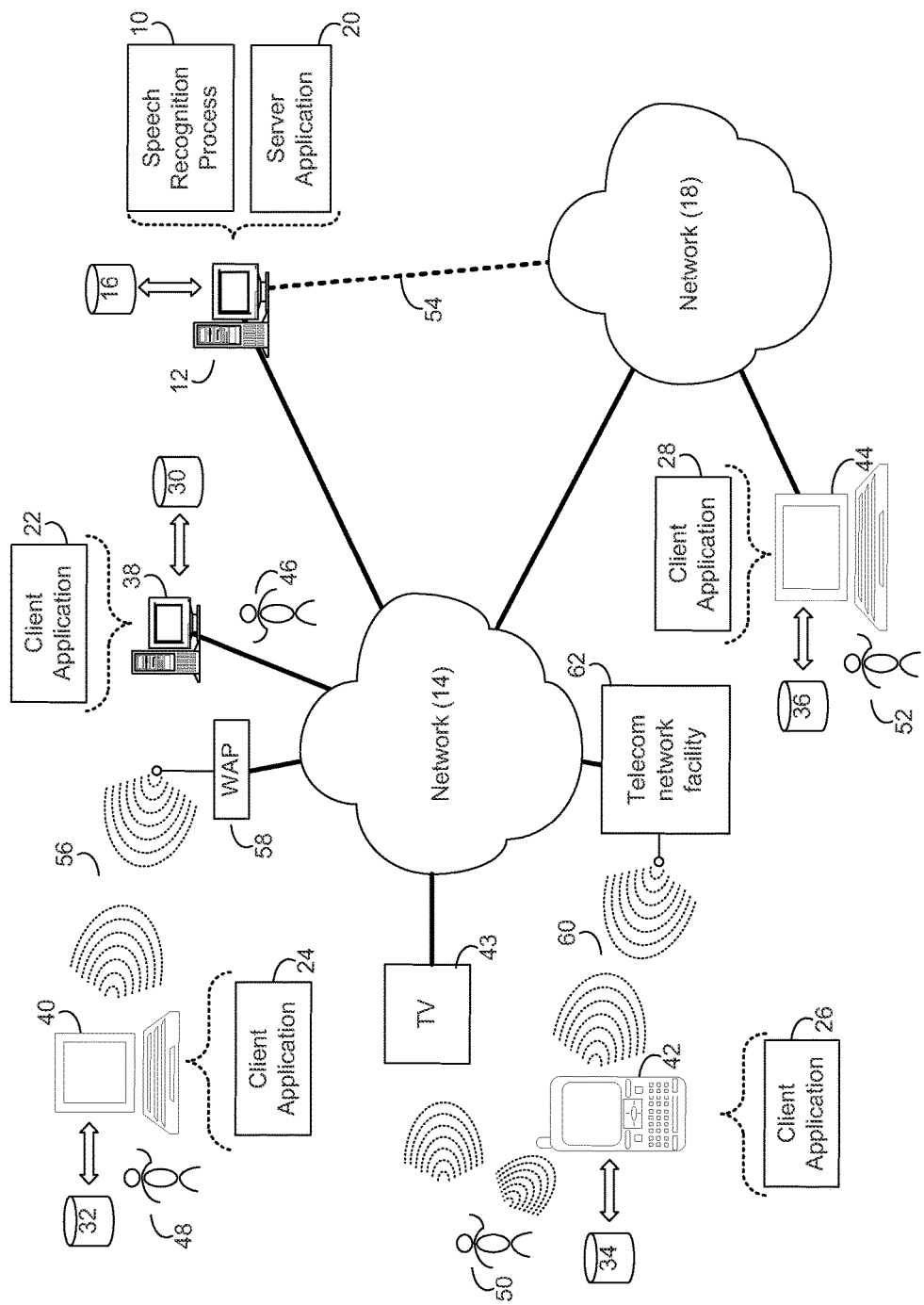
FIG. 1 is a diagrammatic view of a speech recognition process in accordance with an embodiment of the present disclosure.

Referring to FIG. 1, there is shown a speech recognition process 10 that may reside on and may be executed by computer 12, which may be connected to network 14 (e.g., the Internet or a local area network). Server application 20 may include some or all of the elements of speech recognition process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail in FIGS. 2-6, speech recognition process 10 may include receiving (602), at a first computing device, a far-talk signal from a far-talk computing device, the far-talk signal transmitted using a first channel and corresponding to an audible sound. The method may further include receiving (604), at the first computing device, a near-talk signal from a near-talk computing device, the near-talk signal transmitted using a second channel and corresponding to the audible sound, wherein the far-talk signal and the near-talk signal are received during an enrollment phase of a far-talk speech recognition system. The method may also include updating (606), at the first computing device, one or more models associated with a far-talk speech recognition system based upon, at least in part, one or more characteristics of the far-talk signal and one or more characteristics of the near-talk signal.

The instruction sets and subroutines of speech recognition process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, speech recognition process 10 may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of speech recognition process 10. Accordingly, speech recognition process 10 may be a purely server-side application, a purely client-side application, or a hybrid server-side/client-side application that is cooperatively executed by one or more of client applications 22, 24, 26, 28 and speech recognition process 10.

Client electronic devices 38, 40, 42, 44 may each execute an operating system, examples of which may include but are not limited to Apple iOS™, Microsoft Windows™, Android™, Redhat Linux™, or a custom operating system.

Users 46, 48, 50, 52 may access computer 12 and speech recognition process 10 directly through network 14 or through secondary network 18. Further, computer 12 may be connected to network 14 through secondary network 18, as illustrated with phantom link line 54. In some embodiments, users may access speech recognition process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

The phrase "telecommunications network facility", as used herein, may refer to a facility configured to transmit, and/or receive transmissions to/from one or more mobile devices (e.g. cellphones, etc). In the example shown in FIG. 1, telecommunications network facility 62 may allow for communication between TV 43, cellphone 42 and server computing device 12. This particular type of arrangement is discussed in further detail with reference to FIGS. 2-3, which are discussed in further detail below.

Figure 2:
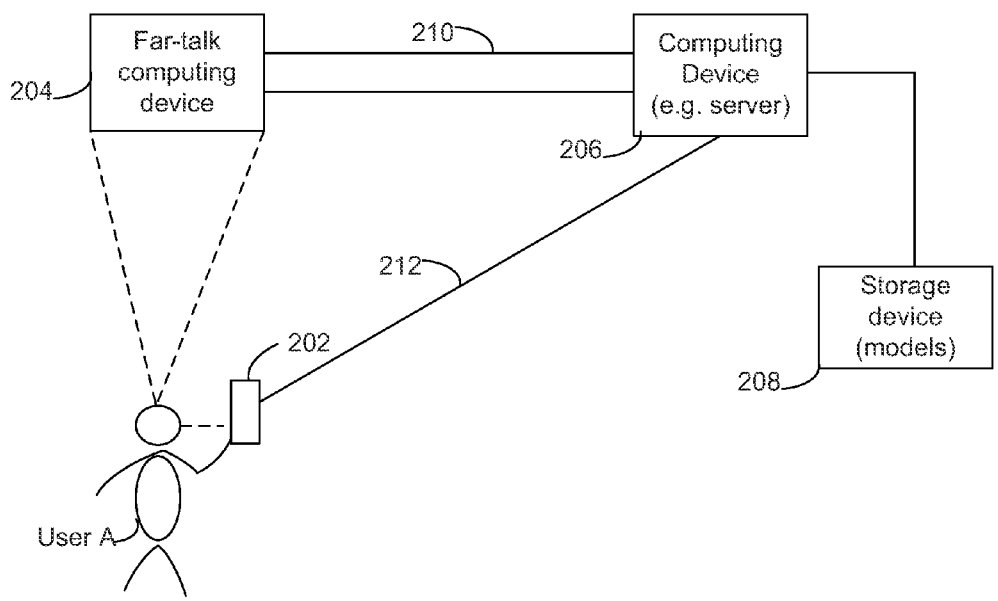
FIG. 2 is a diagrammatic view of a system configured to implement a speech recognition process in accordance with an embodiment of the present disclosure.

Referring now to FIG. 2, an embodiment of speech recognition process 10 shown within an example of an ASR system 200 is depicted. In this particular embodiment, system 200 may include near-talk device 202, far-talk device 204, computing device 206, and one or more storage devices 208, which may be configured to store various ASR models and transforms. In some embodiments, computing device 206 and the one or more storage devices 208 may have a similar configuration to that of server computing device 12 and storage device 16 described above with reference to FIG. 1.

In the particular embodiment depicted in FIG. 2, near-talk computing device 202 may be a cellphone, television remote control, or any other suitable device (e.g. User A's cellphone, etc.). Far-talk computing device 204 may correspond to a television such as television 43 shown in FIG. 1. As shown in FIG. 2, near-talk computing device 202 may be physically closer to User A than far-talk device 204. It should be noted that although much of the discussion included herein is directed towards the example of using a television as the far-talk device, this is merely for purposes of example. Speech recognition process 10 may be used in accordance with any suitable device and in any suitable venue. For example, the teachings of the present disclosure may be configured to operate in a vehicle such as an automobile or in any other situation that may include both a near-talk and far-talk device as defined above.

Accordingly, in some embodiments, speech recognition process 10 may include receiving (602) at a first computing device (e.g. computing device 206), a far-talk signal from far-talk computing device 204. In some embodiments, the far-talk signal may be transmitted using a first channel 210, which may correspond to any suitable delivery mechanism, for example, the various networks depicted in FIG. 1. The far-talk signal may correspond to an audible sound such as an utterance from User A.

Additionally and/or alternatively, speech recognition process 10 may further include receiving (604), at the first computing device (e.g. computing device 206), a near-talk signal from a near-talk computing device 202. In some embodiments, the near-talk signal may be transmitted using second channel 212, which may correspond to any suitable delivery mechanism, for example, the various networks depicted in FIG. 1. The near-talk signal may correspond to an audible sound such as an utterance from User A.

In some embodiments, one or more of the far-talk signal and the near-talk signal may be received by computing device 206. For example, these signals may be received during an enrollment phase of a speech recognition system. The enrollment phase may generally involve the recording of the speaker's voice (e.g. User A) as well as the extraction of a number of characteristics. Accordingly, the extracted characteristics may be compared to a number of voice models (e.g. those associated with storage device 208) in order to determine one or more voice models that most closely match the speech patterns of the user (e.g. User A).

In some embodiments, the far-talk signal and the near-talk signal may each include an identification code associated therewith. The identification code may be used to identify the device responsible for transmission of the signal. For example, far-talk signal may include an identification code identifying far-talk computing device 204 and may be transmitted through channel 210. Similarly, near-talk signal may include its own identification code identifying near-talk device 202. Both the signal and the identification code may be transmitted through channel 212 to computing device 206. The identification code may be used, for example, to associate the close-talk speech to the corresponding far-talk speech.

Accordingly, speech recognition process 10 may further include updating (606), at the first computing device (e.g. computing device 206), one or more models (e.g. the models associated with storage device 208) associated with ASR system 200. In some embodiments, updating may be based upon, one or more characteristics of the far-talk and near-talk signals and may be achieved using any suitable computing device such as computing device 206.

In operation, User A may speak the utterance and far-talk computing device 204 may transmit the single or multi-channel speech to computing device 206. At approximately the same time, near-talk computing device 202 may be used to transmit the near-talk speech to computing device 206. In some embodiments, near-talk computing device 202 may only be required during the enrollment process. If close talk speech is available during recognition, speech recognition process 10 may utilize it in order to improve accuracy.

In some embodiments, these two computing devices may be associated with each another via their client identification codes. Once the new model parameters and/or feature transforms are learned using the aforementioned or any other techniques, they may be stored in storage device 208 for subsequent use. Additionally and/or alternatively, in the live recognition phase, the additional close talk channel may not be required.

In some embodiments, updating the one or more models may include estimating one or more references for applying unsupervised adaptation techniques associated with the far-talk speech recognition system. Accordingly, the near-talk channel may be used to improve the far-talk ASR system by estimating more accurate references for applying unsupervised adaptation techniques on far-talk speech. In this way, speech recognition process 10 may utilize the near-talk channel to more accurately estimate references, thus providing for more accurate transcription while obviating the need for human transcription.

In some embodiments, updating the one or more models may include determining a non linear mapping between the far-talk signal and the near-talk signal. For example, a signal could include digitized audio samples and/or speech recognition features derived from the audio. Accordingly, the near-talk channel may be used to improve the far talk ASR system to learn a non linear mapping from the far-talk domain to near-talk domain, which may be applied during recognition. The non linear mapping may be applied on the speech samples or speech recognition features such as spectral or cepstral features.

In some embodiments, updating the one or more models may include determining at least one impulse response characteristic. Accordingly, the near-talk channel may be used to improve the distant talk ASR system in order to learn the room impulse responses characteristics, which may then be further exploited. Thus, the impulse response of the room may be determined and any distortions created by the room may be accounted for as necessary. Other embodiments may involve determining the impulse response of other areas (e.g. the inside of a vehicle, which may utilize speech recognition process 10, etc.). Determining the impulse response may be achieved using one or more microphones, which may be configured to record information such as audio data (e.g., a user's speech or some pre-recorded signal) in order to determine the impulse response. The microphones may be in communication with one or more computing devices, such as those described herein, which may be configured to calculate the impulse response. The nature and configurations of the microphones are discussed in further detail below.

Embodiments disclosed herein may be configured to support speech input via multi channel array microphones. In this way, television viewers may be able to sit comfortably in a living room environment and be able to speak commands, searches and messages to their television (e.g. television 43) via array microphones. The array may be configured to distinguish between users and the noise emanating from the television or other entertainment sources. In some embodiments, the array may be configured to follow speakers around the living room via visual input if they move from one seat to another, and should also support multiple speakers in the living that are sitting in different locations (in this case the system may be able to signal to the people in the room which person it is listening to at any particular moment). In some cases, this may be achieved using facial or gesture recognition technology. The system may also support a setting in which it can accept input from a restricted user set, in which case it may ignore all other speakers, or any user set, in which it listens to any user that speaks. The concept of voice biometrics may be explored to identify the user set. The system may also adapt to frequent speakers, of various ages and both genders, over time to improve overall performance.

In some embodiments, updating the one or more models may include optimizing the system using spatial filtering. More specifically, the near-talk channel may be used to improve the far-talk ASR system by optimizing one or more beam-forming settings. For example, when an array of microphones is used the near-talk channel may provide results that may be used to tune the system.

It should be noted that the microphones associated with the embodiments of the present disclosure may be of any suitable design. Further, the microphones may be located in numerous electronic devices in addition to the near-talk and far-talk devices described herein. For example, one or more microphones may be located within a remote control device, a cellphone, tablet computing device, television, set-top-box, receiver, etc.

As discussed above, the near-talk channel often is available as an alternative channel in some applications such as a speech TV remote control with an additional built-in microphone or a head set in the case of distant-talk speech recognition software application. In other applications, an alternative additional channel is not readily available. In such an implementation, embodiments described herein may allow for the use of a smart phone or any other device. For example, the use of a smartphone in the context of an ASR system is discussed in further detail below with reference to FIG. 3.

Figure 3:
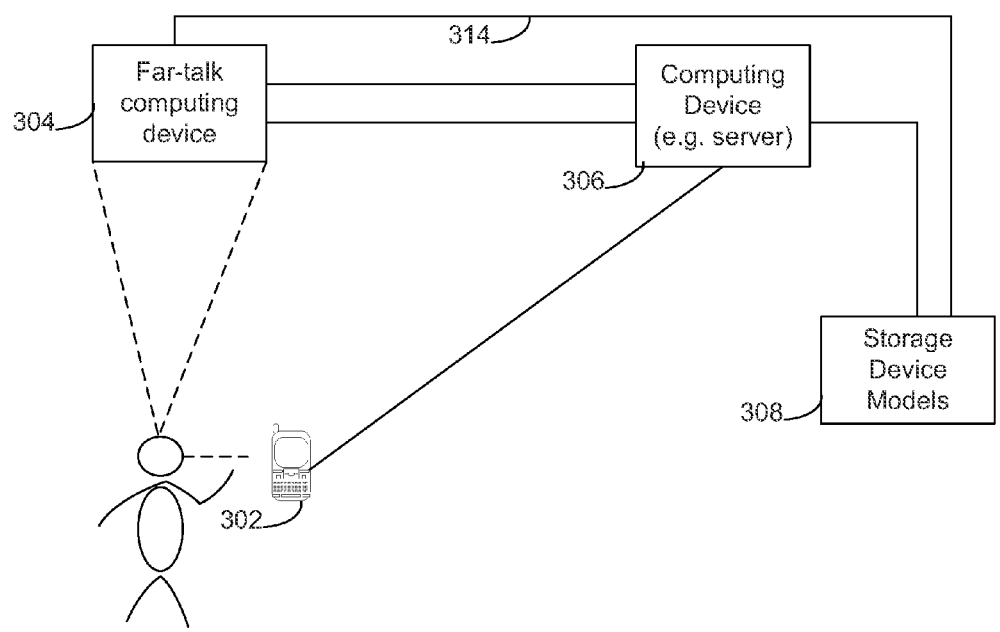
FIG. 3 is a diagrammatic view of a system configured to implement a speech recognition process in accordance with an embodiment of the present disclosure.

Referring now to FIG. 3, an embodiment of speech recognition process 10 utilizing a smartphone as near-talk device 302 is shown. Further, in this particular embodiment, speech recognition process 10 may also include the ability to transmit one or more models from computing device 306 to far-talk computing device 304. In some applications, it may be necessary or convenient for the learned models and/or feature transforms to reside on the client. For example, in applications enabled with a hybrid ASR system, a local embedded recognizer may also be available and it may be beneficial to update some of the acoustic model components. Accordingly, in some embodiments, a secondary data channel 314 may be established to transfer the learned parameters back to far-talk computing device 304 as is depicted in FIG. 3.

Additionally and/or alternatively, embodiments of speech recognition process 10 may include transmitting a far-talk signal from a far-talk computing device to a server computing device (e.g. computing device 206, 306, etc.). The far-talk signal may be transmitted using a first channel and may correspond to an audible sound. Speech recognition process 10 may further include transmitting a near-talk signal from a near-talk computing device to a server computing device. In some cases, the near-talk signal may be transmitted using a second channel and may correspond to the audible sound. The far-talk signal and the near-talk signal may be received at any suitable time, for example, during an enrollment phase of a far-talk speech recognition system. The server computing device may be configured to update one or more models associated with a far-talk speech recognition system based upon, at least in part, one or more characteristics of the far-talk signal and one or more characteristics of the near-talk signal.

Figure 4:
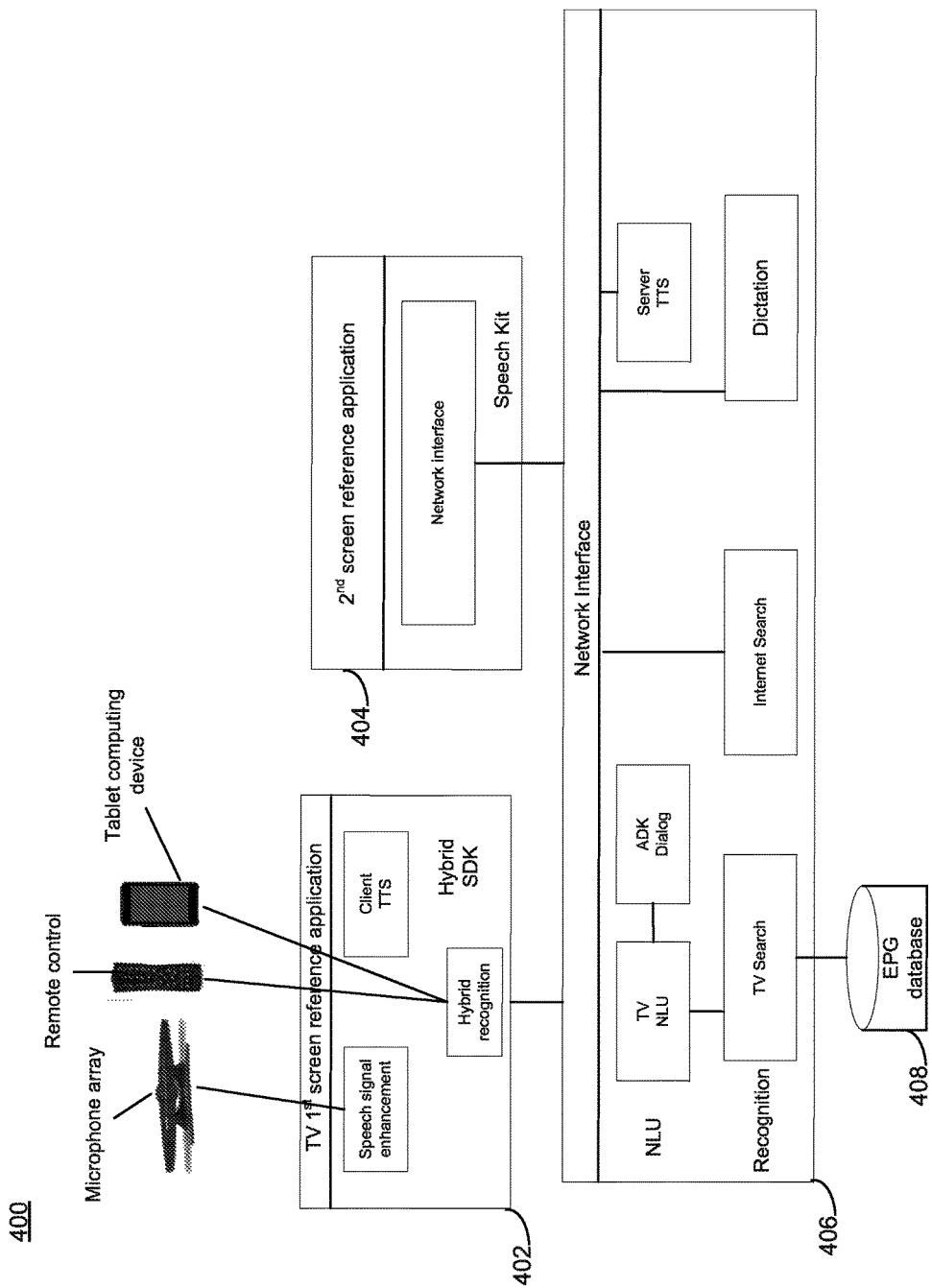
FIG. 4 is a diagrammatic view of a system configured to implement a speech recognition process in accordance with an embodiment of the present disclosure.

Referring now to FIG. 4, an embodiment depicting a high-level architecture of an example system 400 configured to implement speech recognition process 10 is provided. System 400 may include far-talk device 402, near-talk device, 404, server computing device 406, and storage device 408. In this particular example, far-talk device 402 may correspond to a television or set-top-box while near-talk device 404 may correspond to a cellphone, tablet, remote control, or other suitable device. Devices 402 and 404 may communicate with server computing device 406 using an associated network interface.

Embodiments of speech recognition process 10 may utilize stochastic data models, which may be trained using a variety of domain data. Some modeling types may include, but are not limited to, acoustic models, language models, NLU grammar, etc.

Figure 5:
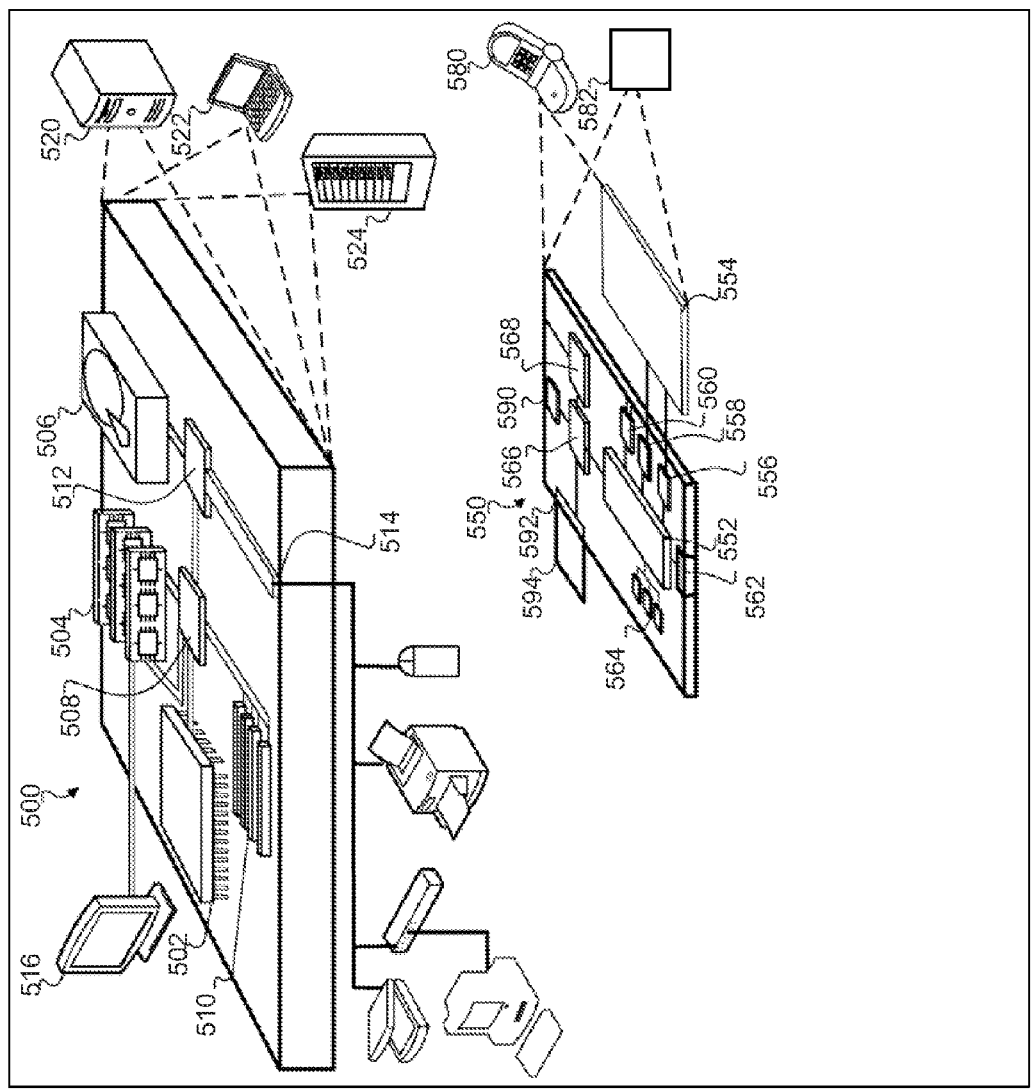
FIG. 5 shows an example of a computer device and a mobile computer device that can be used to implement the techniques described here.
Figure 6:
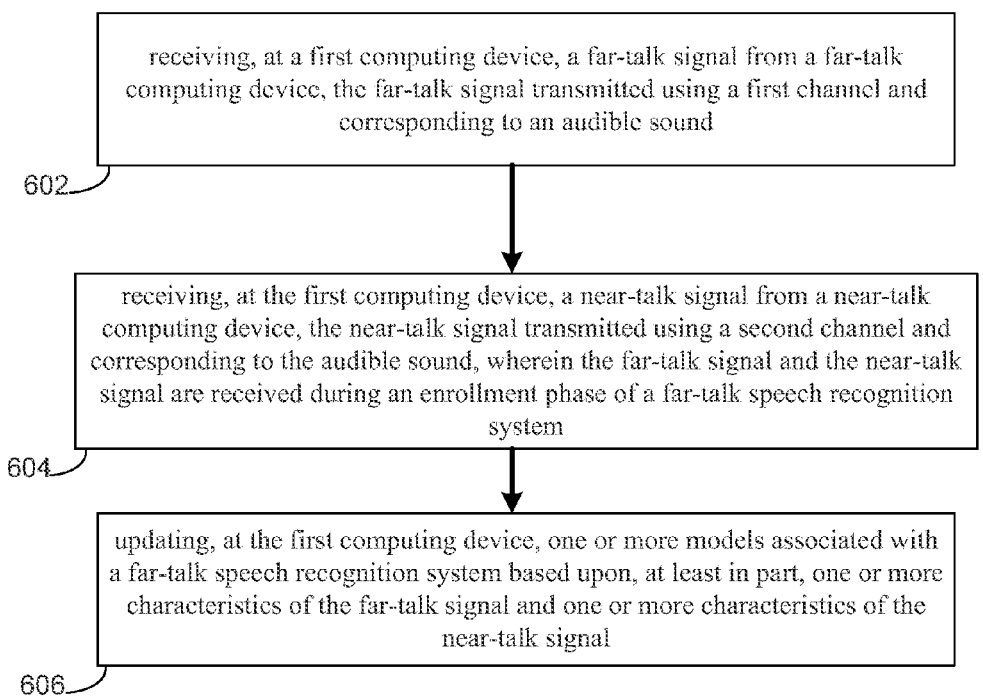
FIG. 6 is a flowchart of a speech recognition process in accordance with an embodiment of the present disclosure.

Referring now to FIG. 5, an example of a generic computer device 500 and a generic mobile computer device 550, which may be used with the techniques described here is provided. Computing device 500 is intended to represent various forms of digital computers, such as tablet computers, laptops, desktops, workstations, personal digital assistants, servers, blade servers, mainframes, and other appropriate computers. In some embodiments, computing device 550 can include various forms of mobile devices, such as personal digital assistants, cellular telephones, smartphones, and other similar computing devices. Computing device 550 and/or computing device 500 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 500 may include processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, may be interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multiprocessor system).

Memory 504 may store information within the computing device 500. In one implementation, the memory 504 may be a volatile memory unit or units. In another implementation, the memory 504 may be a non-volatile memory unit or units. The memory 504 may also be another form of computer-readable medium, such as a magnetic or optical disk.

Storage device 506 may be capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

High speed controller 508 may manage bandwidth-intensive operations for the computing device 500, while the low speed controller 512 may manage lower bandwidth-intensive operations. Such allocation of functions is exemplary only. In one implementation, the high-speed controller 508 may be coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 may include a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, may be interconnected using various buses, and several of the components may be mounted on a common motherboard or in other manners as appropriate.

Processor 552 may execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

In some embodiments, processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

In some embodiments, memory 564 may store information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

Computing device 550 may be implemented in a number of different forms, as shown in the figure. For example, it may be implemented as a cellular telephone 580. It may also be implemented as part of a smartphone 582, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving, at a first server computing device via a network, a far-talk signal from a far-talk computing device having at least one processor, the far-talk signal transmitted using a first channel and corresponding to an audible sound of a user, wherein the network is at least one of the Internet or a local area network;
   receiving, at the first server computing device via the network, a near-talk signal from a near-talk computing device having at least one processor, the near-talk signal transmitted using a second channel and corresponding to the audible sound of the user, wherein the far-talk signal and the near-talk signal are received during an enrollment phase of a far-talk speech recognition system; and updating, at the first server computing device, one or more voice models associated with a far-talk speech recognition system that best match a speech pattern of the user with the one or more voice models utilizing, at least in part, one or more characteristics of the far-talk signal and one or more characteristics of the near-talk signal.

2. The method of claim 1, wherein updating includes estimating one or more references for applying unsupervised adaptation techniques associated with the far-talk speech recognition system.

3. The method of claim 1, wherein updating includes determining a non linear mapping between the far-talk signal and the near-talk signal.

4. The method of claim 1, wherein updating includes determining at least one room impulse response characteristic.

5. The method of claim 1, wherein updating includes optimizing at least one beam-forming setting.

6. The method of claim 1 wherein the near-talk device is a mobile phone.

7. The method of claim 6, wherein the far-talk device is an in-car device.

8. The method of claim 1, wherein receiving a far-talk signal includes receiving an identification code associated with the far-talk computing device.

9. The method of claim 1, wherein receiving a near-talk signal includes receiving an identification code associated with the near-talk computing device.

10. The method of claim 1, further comprising:
transmitting via the network, and using the first server computing device, the one or more models to the far-talk computing device.

11. The method of claim 1 wherein the near-talk device is a remote control and the far-talk device is a television or a device associated with a television.

12. A system comprising:
a first server computing device having at least one processor configured to receive, via a network, a far-talk signal from a far-talk computing device having at least one processor, the far-talk signal transmitted using a first channel and corresponding to an audible sound of a user, wherein the network is at least one of the Internet or a local area network, the first server computing device having the at least one processor being further configured to receive a near-talk signal from a near-talk computing device having at least one processor, the near-talk signal transmitted using a second channel and corresponding to the audible sound of the user, wherein the far-talk signal and the near-talk signal are received during an enrollment phase of a far-talk speech recognition system, the first server computing device having the at least one processor being further configured to update one or more voice models associated with a far-talk speech recognition system that best match a speech pattern of the user with the one or more voice models utilizing, at least in part, one or more characteristics of the far-talk signal and one or more characteristics of the near-talk signal.

13. The system of claim 12, wherein updating includes estimating one or more references for applying unsupervised adaptation techniques associated with the far-talk speech recognition system.

14. The system of claim 12, wherein updating includes determining a non linear mapping between the far-talk signal and the near-talk signal.

15. The system of claim 12, wherein updating includes determining at least one room impulse response characteristic.

16. The system of claim 12, wherein updating includes optimizing at least one beam-forming setting.

17. The system of claim 12, wherein the near-talk device is at least one of a mobile phone and a remote control device.

18. The system of claim 12, wherein the far-talk device is at least one of a television and an in-car device.

19. The system of claim 12, wherein receiving a far-talk signal includes receiving an identification code associated with the far-talk computing device.

20. The system of claim 12, wherein receiving a near-talk signal includes receiving an identification code associated with the near-talk computing device.

21. A computer-implemented method comprising:
transmitting, via a network, a far-talk signal from a far-talk computing device having at least one processor to a server computing device, the far-talk signal transmitted using a first channel and corresponding to an audible sound of a user, wherein the network is at least one of the Internet or a local area network;

transmitting, via the network, a near-talk signal from a near-talk computing device having at least one processor to a server computing device, the near-talk signal transmitted using a second channel and corresponding to the audible sound of the user, wherein the far-talk signal and the near-talk signal are received during an enrollment phase of a far-talk speech recognition system; and updating, by the server computing device, one or more voice models associated with a far-talk speech recognition system that best match a speech pattern of the user with the one or more voice models utilizing, at least in part, one or more characteristics of the far-talk signal and one or more characteristics of the near-talk signal.

* * * * *